US007551621B1

(12) United States Patent
Hedge et al.

(10) Patent No.: US 7,551,621 B1
(45) Date of Patent: Jun. 23, 2009

(54) METHOD FOR DETECTING AND REDUCING PACKET DROPS

(75) Inventors: Nikhil Hedge, Round Rock, TX (US); Aruna Yedavilli, Austin, TX (US); Kavitha Vittal Murthy Baratakke, Austin, TX (US); Rashmi Narashimhan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/176,489

(22) Filed: Jul. 21, 2008

(51) Int. Cl.
*H04L 12/56* (2006.01)
(52) U.S. Cl. .................. 370/394; 370/235; 370/468
(58) Field of Classification Search ................ 370/230, 370/230.1, 231, 232, 233, 234, 235, 236, 370/252, 253, 395.21, 395.41, 465, 468; 709/227, 228, 232, 233, 235
See application file for complete search history.

(56) References Cited

U.S. PATENT DOCUMENTS

| 6,246,684 | B1 * | 6/2001 | Chapman et al. | ............ 370/394 |
| 6,341,129 | B1 * | 1/2002 | Schroeder et al. | ........... 370/354 |
| 6,415,329 | B1 * | 7/2002 | Gelman et al. | .............. 709/245 |
| 6,473,425 | B1 * | 10/2002 | Bellaton et al. | ............. 370/392 |
| 6,587,431 | B1 * | 7/2003 | Almulhem et al. | .......... 370/229 |
| 6,801,940 | B1 * | 10/2004 | Moran et al. | ................ 709/224 |
| 2002/0004841 | A1 * | 1/2002 | Sawatari | ..................... 709/232 |
| 2003/0012138 | A1 * | 1/2003 | Abdelilah et al. | ........... 370/231 |

FOREIGN PATENT DOCUMENTS

WO WO 9711566 A2 * 3/1997
WO WO 9816046 A1 * 4/1998

OTHER PUBLICATIONS

Sathitwiriyawong, C. et al., "Integrating Buffer Control and Lost Control Collaboration for the Transmission of Real-time Multimedia Data Streams," IEEE Region 10 Conference, TENCON, Nov. 2004, vol. 2, pp. 65-68.*
Kamerman et al., "WaveLAN®-II: A High-Performance Wireless LAN for the Unlicensed Band", *Bells Labs Technical Journal*; pp. 118-133, (Summer 1997).
Lacage et al. "IEEE 802.11 Rate Adaptation: A Practical Approach", MSWiM, 04, Oct. 4-6, 2004, Venezia,Italy.

* cited by examiner

*Primary Examiner*—Donald L Mills
(74) *Attorney, Agent, or Firm*—Locke Lord Bissell & Liddell LLP

(57) ABSTRACT

A method for detecting and reducing packet drops in a communications system may include receiving a first packet having a sequence number, determining if a second packet having a sequence number immediately preceding the sequence number of the first packet is lost, and/or determining if a third packet having a sequence number immediately preceding the sequence number of the second packet is lost. A counter may be incremented if the second and third packets are determined as lost. An amount of time required before detecting link activity after an end of a previous frame may be reduced if the counter violates the count threshold and the amount of time has not been previously reduced. A lower link speed may be negotiated if a current link speed is above a negotiable threshold and the amount of time required before detecting link activity has been previously reduced.

1 Claim, 2 Drawing Sheets

METHOD FOR DETECTING AND REDUCING PACKET DROPS

FIELD

Example embodiments relate to packet transmission/reception, and for example, to a method for detecting and reducing packet drops.

BACKGROUND

The IEEE 802.3 standard requires that an Ethernet node transmitting frames on the physical media provide a minimum "idle" time between the transmission of consecutive frames. An idle time or inter-packet gap is provided before transmission of a next frame starts in an attempt to allow a relatively small time interval for receiver electronics in each of the nodes to settle after completion of a previous frame. For example, an idle time of 9.6 µs may be provided between transmission of consecutive frames in some networks.

A node may start transmission of a frame by sending an 8 byte (i.e., 64 bit) preamble sequence. The preamble sequence may consist of 62 alternating 1's and 0's followed by the pattern '11'. Although each node in a system is required to provide the idle time between the transmission of frames, receiving nodes may not see a silent period or inter-packet gap equal to the full idle time. A repeater element between a source and destination node may lose preamble bits if trying to synchronize an incoming packet. Accordingly, repeater elements between the source and destination node need to regenerate the lost bits of the preamble. The time required for the repeater elements to regenerate the lost bits may cause a reduction in the inter-packet gap between frames.

Receiving adapters at nodes may attempt to address the reduction in the inter-packet gap by beginning to detect link activity within a time period at least equal to the inter-packet gap after the end of the previous frame. However, most adapters are capable of beginning detection before the inter-packet gap period expires. If the reduced inter-packet gap is less than the amount of time required by the receiving node before detecting link activity between two consecutive packets, the receiving adapter sees the two consecutive packets as a single packet, drops the two consecutive packets together, and accounts the drop as a single cyclic redundancy check (CRC) error.

Conventionally, detecting that two consecutive packets are missing has been relatively difficult based only on the packet loss statistics reported by transmission control protocol (TCP) and other protocols. IP traces may be used to confirm the loss of two consecutive packets, but an IP tracing method requires more debugging. Conventional solutions for detecting and correcting the loss of two or more consecutive packets require manual intervention by a user including checking network elements' inter-packet gap settings, cable lengths, number of repeating elements, etc. Accordingly, until a user implements these changes, network traffic may be adversely affected. For example, if TCP loses packets due to inter-packet gap problems, at least two packets need to be retransmitted. Because two packets are dropped, a timeout event is retransmitted thereby causing a larger reduction in the throughput of a connection.

SUMMARY

Example embodiments provide a self-detecting and self-correcting mechanism to detect and reduce packet drops due to inter-packet gap reductions.

According to an example embodiment, a method for detecting and reducing packet drops in a communications system may include receiving a first packet having a sequence number, determining if a second packet having a sequence number immediately preceding the sequence number of the first packet is lost, and/or determining if a third packet having a sequence number immediately preceding the sequence number of the second packet is lost if the second packet is determined as lost. A counter may be incremented if the second and third packets are determined as lost. A first error message may be logged if the counter violates a count threshold. An amount of time required before detecting link activity after an end of a previous frame may be reduced if the counter violates the count threshold and the amount of time required before detecting link activity has not been previously reduced. A lower link speed may be negotiated if a current link speed is above a negotiable threshold and the amount of time required before detecting link activity has been previously reduced. A second error message may be logged if the current link speed is not above the negotiable threshold.

DETAILED DESCRIPTION

Figure 1:
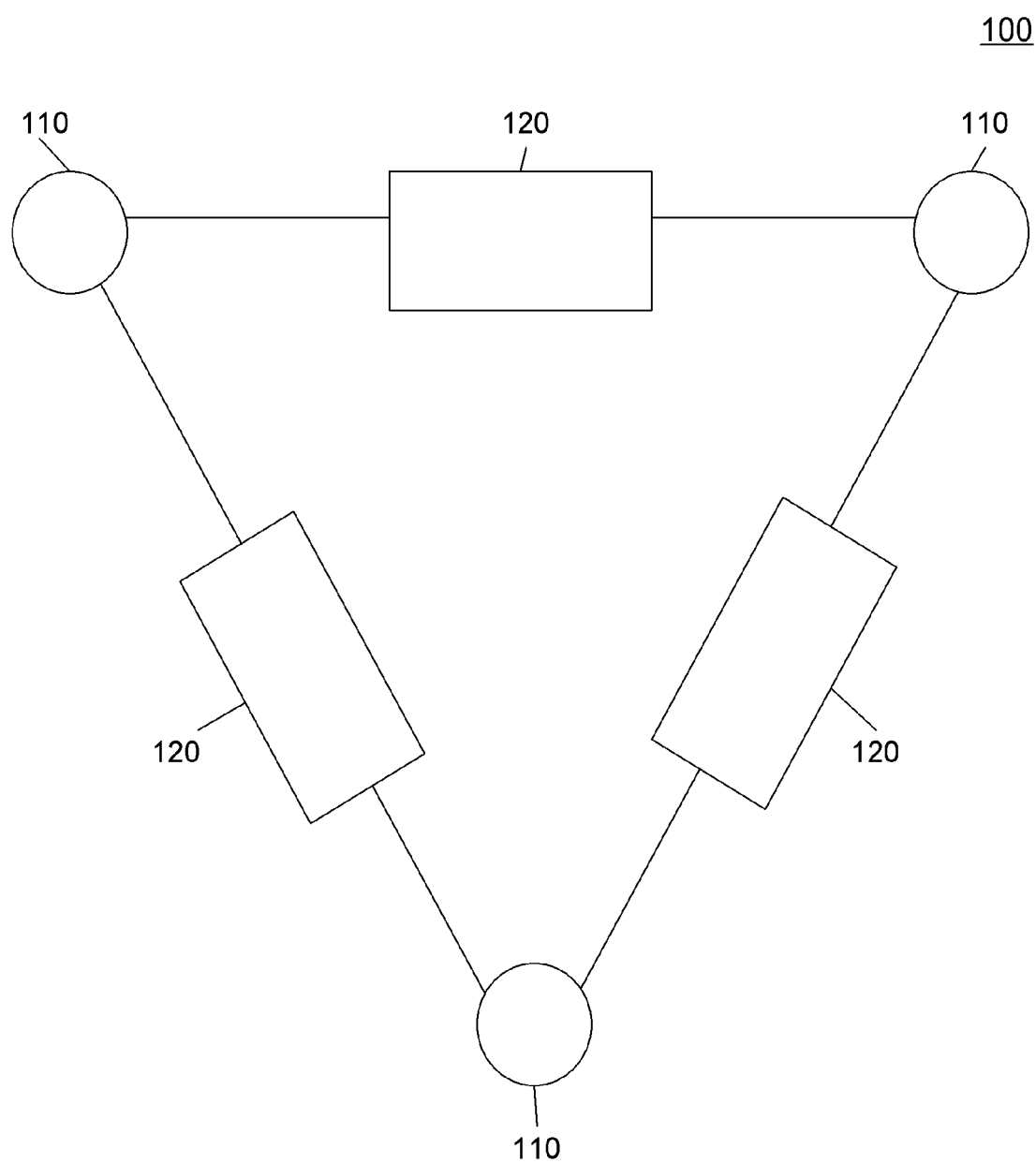
FIG. 1 illustrates an example communications system according to an example embodiment.

FIG. 1 illustrates an example communications network 100 including a plurality of nodes 110 and at least one repeater element 120 between at least two of the nodes 110. A destination node may receive frames transmitted from a source node in the network 100. Frames transmitted from the source node may pass through one or more repeater elements 120 in route to the destination node. The nodes 110 may include an adapter configured to receive/transmit packet transmissions and/or a driver configured to control the adapter.

Transmission protocols, (e.g., transmission control protocol (TCP)), may more easily detect a loss of two or more consecutive packets based on sequence numbers of the incoming packets. For example, if a packet is received at a destination node, the sequence number of the received packet may be compared to an expected sequence number or the sequence number of the last received packet which was not lost. Accordingly, missing sequence numbers may be used to identify any packets which may have been lost before the last received packet. The transmission protocol may provide feedback to the adapter or driver of a node to take corrective actions if a desired, or alternatively, a predetermined number of consecutive packet loss events are recorded.

Figure 2:
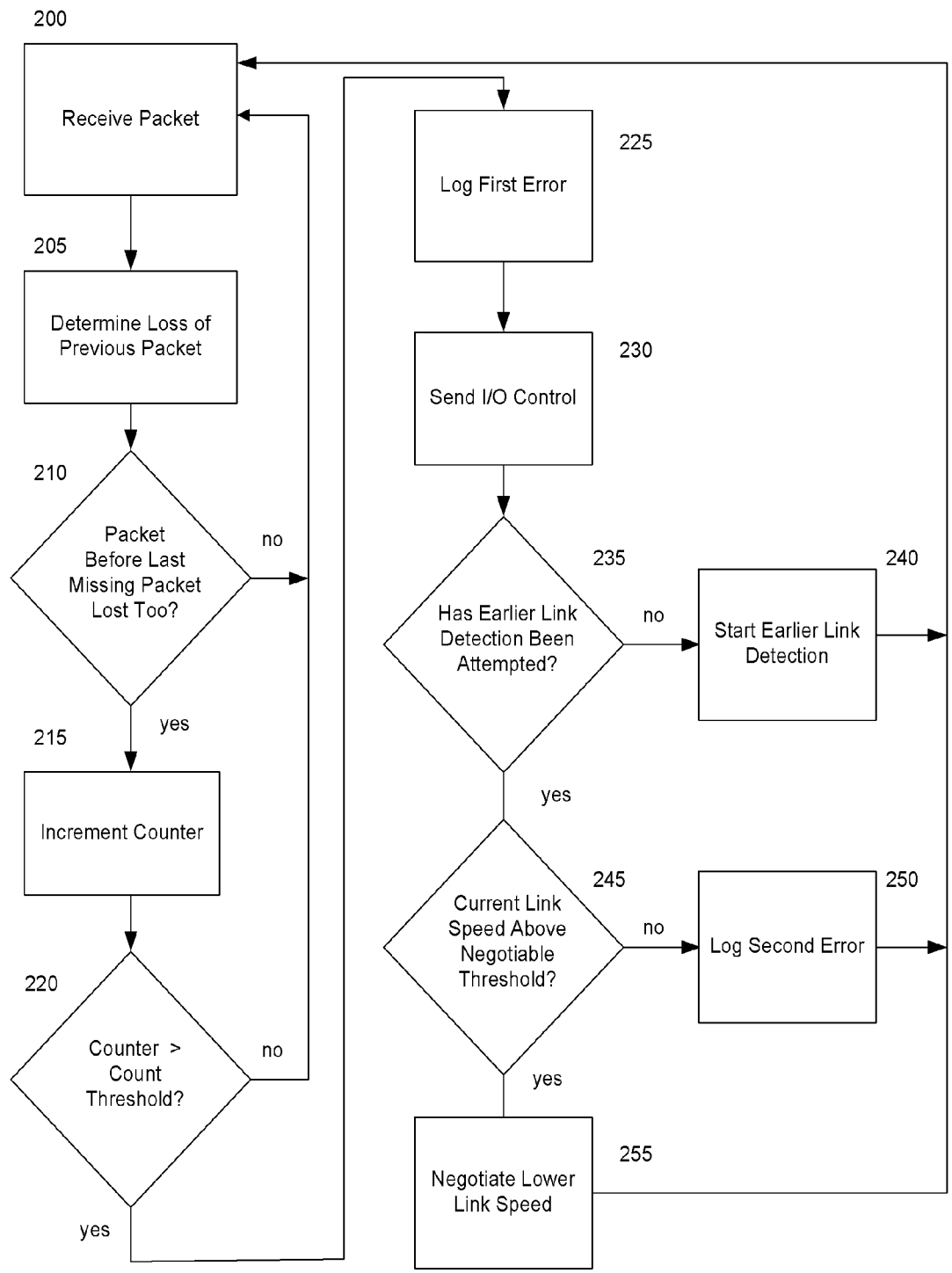
FIG. 2 is a flow-chart illustrating a method for detecting and reducing packet drops according to an example embodiment.

As illustrated in FIG. 2, at step 200 the receiving adapter of a destination node may receive a packet. At step 205, the destination node, (e.g., a transmission protocol of the destination node), may determine if a packet having a sequence number immediately preceding the sequence number of the received packet is lost. For example, the destination node may determine if a previous packet which should have been received before the last received packet is lost, (e.g., the packet was not received or was dropped by the receiving adapter), based on the sequence numbers. At step 210, the destination node may determine if the packet before the last missing packet is lost. If both packets are not lost, processing may return to step 200 and wait to receive the next packet at the receiving adapter of the destination node. If both packets are lost are determined as lost, a counter may be incremented at step 215. Accordingly, a loss of two or more consecutive packets may be detected based on the sequence numbers of the packets, and a number of consecutive packet loss events may be recorded by the counter.

At step 220, the counter may be compared to a count threshold. The count threshold may be a desired, or alternatively, a predetermined number of times two or more consecutive packets need to be lost at a receiving node before the network initiates a corrective mechanism. If the counter violates the count threshold a first error message may be logged to notify a network user at step 225. If the counter does not violate the count threshold, processing may return to step 200 and wait to receive the next packet at the receiving adapter of the destination node.

At step 230, input/output control instructions may be sent to the driver of the destination node. For example, in TCP the NDD_DUP_CKS UMS ioctl may be sent to the driver. At step 235, the destination node may determine if an amount of time required before detecting link activity after an end of a previous frame has been previously reduced. For example, the destination node may determine if the adapter of the destination node has already attempted earlier link detection. If the amount of time required before detecting link activity after the end of a previous frame has not been previously reduced, the amount of time required before detecting link activity may be reduced at step 240 and processing may return to step 200. For example, the driver may notify the network adapter to start earlier link detection. If the driver has already attempted earlier link detection, the destination node may determine if a current link speed is above a negotiable threshold at step 245. For example, the adapter may attempt to negotiate a lower link speed with an incoming switch. If the adapter is unable to negotiate a lower link speed with the switch, e.g., the current link speed is not higher than the negotiable threshold, a second error message may be logged to notify a network user at step 250 and processing may return to step 200. If the adapter is able to negotiate a lower link speed, e.g., the current link speed is above the negotiable threshold, the driver may notify the adapter to renegotiate link speed to the lower value at step 255 and processing may return to step 200.

Accordingly, a method according to example embodiments may detect consecutive packets lost, (e.g., due to inter-packet gap reductions), and/or initiate correcting mechanisms to reduce a number of packets lost.

Although specific example embodiments have been disclosed, a person skilled in the art will understand that changes can be made to the specific example embodiments without departing from the spirit and scope of the invention.

What is claimed is:

1. A method for detecting and reducing packet drops in a communications system, comprising:
   receiving a first packet having a sequence number at a node in the communications system, the node including an adapter configured to receive and transmit packets and a driver configured to control the adapter;
   determining if a second packet having a sequence number immediately preceding the sequence number of the first packet is lost;
   determining if a third packet having a sequence number immediately preceding the sequence number of the second packet is lost if the second packet is determined as lost,
   incrementing a counter if the second and third packets are determined as lost;
   logging a first error message if the counter violates a count threshold;
   controlling, with the driver, the adapter to reduce an amount of time required before detecting link activity after an end of a previous frame if the counter violates the count threshold and the amount of time required before detecting link activity has not been previously reduced;
   controlling, with the driver, the adapter to negotiate a lower link speed if a current link speed is above a negotiable threshold and the amount of time required before detecting link activity has been previously reduced; and
   logging a second error message if the current link speed is not above the negotiable threshold.

* * * * *